C. WEILAND.
SHOCK ABSORBER.
APPLICATION FILED MAY 23, 1916.
1,216,191. Patented Feb. 13, 1917.
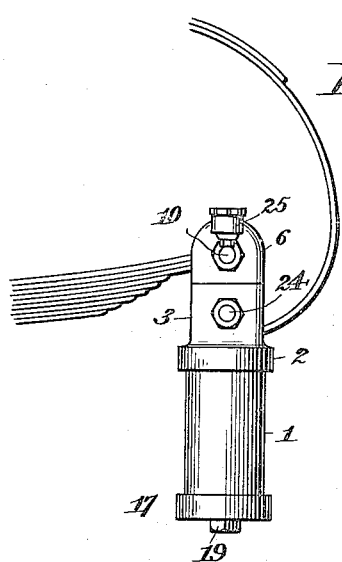
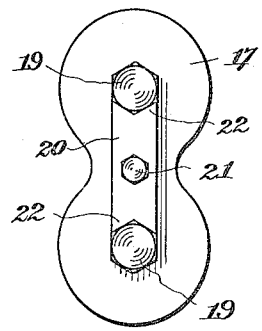
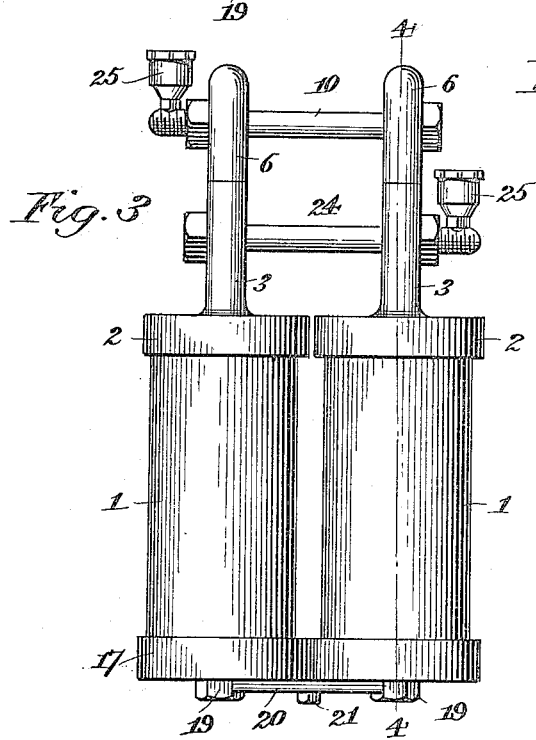
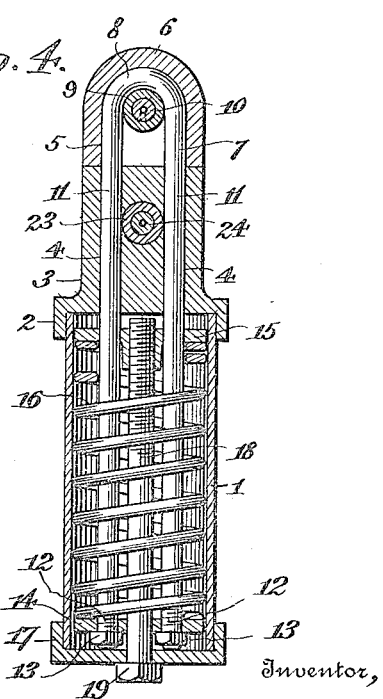
Witness
A. V. Doyle
Inventor,
Charles Weiland.
By Victor J. Evans,
Attorney.

UNITED STATES PATENT OFFICE.

CHARLES WEILAND, OF NEW YORK, N. Y.

SHOCK-ABSORBER.

1,216,191.   Specification of Letters Patent.   Patented Feb. 13, 1917.

Application filed May 22, 1916. Serial No. 99,338.

*To all whom it may concern:*

Be it known that I, CHARLES WEILAND, a citizen of the United States, residing at New York, in the county of New York and State of New York, have invented new and useful Improvements in Shock-Absorbers, of which the following is a specification.

This invention relates to improvements in automobile shock absorbers and has for its principal object, the provision of a device of this character which will include a spring tensioning mechanism wherein provision is made for an initial internal adjustment and for a second external adjustment whereby the spring may be made to properly support the load according to variations therein from time to time. The tensioning mechanism is also designed to permit the structure to be used upon light or heavy cars.

A still further object of the invention resides in the provision of a shock absorber consisting of relatively separable elements which may be expeditiously assembled or disassembled as the occasion demands; one in which the mating parts thereof can be operatively related with one another without threading the parts, and one in which said parts will be of a simple, strong and durable design.

A still further object of the invention resides in the provision of a shock absorber consisting of companion casings supporting cushioning springs, hangers therefor and tensioning mechanism including external adjusting elements and means for holding said external elements against casual derangement from their adjusted positions.

Another object of the invention resides in the provision of a shock absorber consisting of a hanger bolt and shackle bolt and means for lubricating said parts while the device is in use.

With the above and other objects in view which will appear as the nature of the invention is better understood, the same consists in the improved construction and novel arrangements of parts which will hereinafter be more fully described and particularly pointed out in the claims.

In the accompanying drawing has been illustrated, a single and preferred form of the invention, it being, however, understood that no limitations are necessarily made to the precise structural details therein exhibited, but that changes, alterations and modifications within the scope of the claims may be resorted to when desired.

In the drawings:—

Figure 1 is a side view of the device showing the application thereof to an automobile spring.

Fig. 2 is a bottom plan view thereof.

Fig. 3 is a view looking at right angles to the device in Fig. 1.

Fig. 4 is a section taken on the line 4—4, of Fig. 3.

The invention comprises two parallel casings 1—1, each having a removable cap 2, at its upper end from which a vertical lug 3, rises. Each of these lugs is provided with a pair of parallel passages 4—4, alined with the vertical branches of a U shaped passage 5, in a relatively separable cap 6.

Located in each casing is a spring hanger and connecting element which is in the form of a substantially inverted U shaped bolt 7, the bight 8, of which is extended over a bushing, 9, extended through the cap 6 and embracing a shackle bolt 10. The parallel branches 11—11, of the hanger extend through the mentioned passages 4—4, and then into the casing, the terminals thereof having threads 12, to accommodate adjusting nuts 13. These nuts are located beneath a follower 14. A traveling nut or runner 15, is located in the casing, the branches 11—11, being freely extended therethrough and interposed between the nut and the follower 14, is a cushioning spring 16. The follower 14, and the nuts 13, form an external adjusting mechanism whereby the spring can be initially adjusted and tensioned.

The two casings 1—1 are closed at their lower ends by a single cap 17, and extending through said cap in line with the casings 1—1, are adjusting bolts 18, which form external tensioning means for the springs within said casings. These bolts are threadedly connected in the nuts 15 and are freely movable in the lower head 17, and exteriorly of said head they are formed with heads 19. Incident to the many vibrations which are transmitted to the structure in use, the bolts 18, tend to vibrate and come loose from their adjusted positions. I therefore wish to use, in combination with the heads 19, a locking strap or plate 20, which is interposed between the heads and detachably connected with the heads 17, by means of a screw 21. The plate 20, has a length approximately equal to the distance between the heads 19, and the ends of the plate are provided with angularly disposed surfaces 22, which are adapted to come in mutual engagement with the adjacent flat surfaces of said heads 19. This holds the bolts 18, against retrograde rotation.

The bushing 9, extends through both caps 6, of the structure, and located beneath said bushing is a second bushing 23, which also extends into the lugs 3. A bolt 24, is passed through the second bushing 23, and through said lugs 3. The bolts 10 and 24, are provided with removable lubricating cups 25, by means of which a lubricant may be distributed in and around the bushings, causing the parts to work free at all times.

From the description set forth, it will be observed that the device is simple, strong and durable, consisting of comparatively few parts, all of which being so designed whereby they may be readily assembled or disassembled as the occasion necessitates. The cushioning springs may be tensioned initially and after the casings 1 are applied and the bolts 18 connected with the nuts or runners 15, any further tension of the springs can be had by simply adjusting said bolts from the outside of the structure. When the final adjustment of the springs is had, the locking plate or strap 20, is applied in the manner hereinbefore set forth, causing the bolts to be positively locked against retrograde rotation.

What is claimed as new is:—

1. A shock absorber embodying a cap having an upstanding lug, a second cap superimposed upon said lug, a U-shaped hanger having the bight portion thereof held within said second cap and the branches thereof slidable through the first named cap and its lug, a follower adjustable longitudinally of said branches, a runner slidable on said branches and formed with openings, through which said branches extend, a spring interposed between said follower and said runner, and a spring tensioning bolt passing through said follower and having a threaded engagement with said runner.

2. A shock absorber, comprising a pair of casings each having a lug and a cap movable relatively thereto, means connecting the cap of one casing with the cap of the other casing, means connecting the lug of one casing with the lug of the other casing, U-shaped hangers passing through said lugs and caps and over said first means, runners embracing and slidably mounted upon the branches of said hangers within the casings, followers located within the casings and adjustably mounted upon the branches of said hangers, springs interposed between the followers and said runners, and adjusting bolts passing into the casings and having a threaded engagement with said runners.

In testimony whereof I affix my signature in presence of two witnesses.

CHARLES WEILAND.

Witnesses:
LUDWIG BRESNER,
H. G. KOSCH.

Copies of this patent may be obtained for five cents each, by addressing the "Commissioner of Patents, Washington, D. C."